Patented Jan. 22, 1935

1,988,543

UNITED STATES PATENT OFFICE 1,988,543

PROCESS OF PREPARING MIXTURES CONTAINING MINERAL AND BITUMINOUS SUBSTANCES

Karl Daimler, Frankfort-on-the-Main-Hochst, Germany, assignor to I. G. Farbenindustrie Aktiengesellschaft, Frankfort - on - the - Main, Germany No Drawing. Application November 11, 1930, Serial No. 495,003. In Germany November 15, 1929

2 Claims. (Cl. 106—31)

The present invention relates to a process of preparing mixtures containing mineral and bituminous substances.

It is known that mineral material, such as chips, sand or similar material, in a moist condition cannot be intimately mixed with road-making tar, petroleum pitch, mixtures of tar, solutions of petroleum pitch or other bituminous substances. Such incomplete mixtures cannot be compressed and smoothed in the required manner, i. e. either by ramming or by rolling, because they adhere to the tools. It has, therefore, been necessary carefully to dry the mineral material before the preparation of the bituminous mixture. For this purpose large apparatus and considerable costs and time have been required.

I have now found that without a previous drying operation moist or wet mineral substances of any kind, such as ballast, chips, sand, pulverized minerals, cement and the like or mixtures of said substances can be mixed homogeneously with road making tar, petroleum pitch, mixtures of tar, asphalt solutions and the like and compressed without any difficulty with the aid of a suitable rammer or roller, i. e. without adhesion of the mixture to the tool, if there is added to the mineral material, before or while it is mixed with the bituminous substance, a small quantity of lignic acids, humic acids, ground lignite rich in humic acid or ground peat; furthermore the acid substances obtainable from coal or lignite by the treatment with nitric acid, chlorination products or oxidation products of humic substances and other similar bodies; also insoluble calcium salts or ferric salts of any of the acids named above.

All these substances which are insoluble in water are used in form of an aqueous paste. The said acids may likewise be used in form of their soluble alkali salts, if the chemical nature of the mineral mixture is such that the soluble salts are converted either into insoluble alkaline earth salts or into metallic salts. The latter case, for instance, occurs if calcium hydroxide or cement are present in the mixture of mineral material.

By the present invention road making is extremely simplified because the hitherto used expensive drying apparatus can completely be dispensed with; furthermore the invention allows of cold preparation and cold application of many bituminous mineral mixtures which hitherto had to be prepared and in most cases also be applied by the hot process.

The following examples serve to illustrate the invention, but they are not intended to limit it thereto, the parts being by weight:

(1) 900 parts of river sand and 900 parts of basalt chips in their natural moist condition are mixed with 30 parts of an aqueous paste of about 20 per cent. strength of finely ground lignite rich in humic acid; 80 parts of a cold solution consisting of 4 parts of petroleum pitch and 1 part of benzene are added thereto and the whole is mixed until it is homogeneous. The mixture thus obtained is spread on the road and consolidated by means of a roller. It is considerably more homogeneous and can be worked up much better than a mixture prepared from moist materials without using the paste containing humic acid.

(2) 700 parts of river sand, 700 parts of porphyry chips (both in the natural moist condition), 700 parts of cement, 400 parts of water and 50 parts of a paste of 20 per cent strength containing a finely ground mixture of 10 parts of crude lignic acid and 1 part of ammonia of 25 per cent strength are mixed for 1 minute in a cement mixing machine. 150 parts of a mixture of equal parts of petroleum pitch and tar are then caused to run thereto and mixing is continued for about 3 minutes. The crumbly mass thus obtained is spread on the road and then either consolidated by means of a roller or compressed by means of a concrete finisher. Expansion joints are superfluous in this method because the content of bitumen of the mass counteracts the formation of cracks. If in the said mixture the addition of ammonium lignate is omitted, there is not obtained a mixed mass of sufficient homogeneity and such properties as are required for road making.

In the following claims, by the term "humic acid" there is also to be understood the salts of humic acid and substances containing humic acid.

I claim:

1. In a process of mixing mineral materials with a bituminous substance the step which comprises adding an aqueous paste of humic acid to the minerals before they are mixed with the bituminous agent.

2. In a process of mixing mineral materials with a bituminous substance the step which comprises adding an aqueous paste of ground lignite rich in humic acid to the minerals before they are mixed with the bituminous agent.

KARL DAIMLER.